US011055092B1

(12) United States Patent
Basumallik et al.

(10) Patent No.: US 11,055,092 B1
(45) Date of Patent: Jul. 6, 2021

(54) CORRELATING CONTEXTUAL INFORMATION OF INVOKING CODE IN A PROGRAMMING LANGUAGE WITH CONTEXTUAL INFORMATION OF AT LEAST ONE INVOKED CODE IN A DIFFERENT PROGRAMMING LANGUAGE

(71) Applicant: The Mathworks, Inc., Natick, MA (US)

(72) Inventors: Ayon Basumallik, Framingham, MA (US); Meng-Ju Wu, Wellesley, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 16/794,576

(22) Filed: Feb. 19, 2020

(51) Int. Cl.
  *G06F 8/75* (2018.01)
  *G06F 8/30* (2018.01)
  *G06F 9/38* (2018.01)
  *G06F 8/71* (2018.01)
  *G06F 8/51* (2018.01)

(52) U.S. Cl.
  CPC .................. *G06F 8/75* (2013.01); *G06F 8/31* (2013.01); *G06F 8/51* (2013.01); *G06F 8/71* (2013.01); *G06F 9/3838* (2013.01)

(58) Field of Classification Search
  USPC ........................................................ 717/131
  See application file for complete search history.

(56) References Cited

U.S. PATENT DOCUMENTS

| 5,812,850 | A  | * | 9/1998 | Wimble | G06F 11/3624 |
| | | | | | 714/E11.209 |
| 6,049,666 | A  | * | 4/2000 | Bennett | G06F 11/323 |
| | | | | | 717/130 |
| 6,971,091 | B1 | * | 11/2005 | Arnold | G06F 8/443 |
| | | | | | 717/130 |
| 7,111,282 | B2 | * | 9/2006 | Stephenson | G06F 11/3612 |
| | | | | | 714/E11.209 |
| 7,519,959 | B1 | * | 4/2009 | Dmitriev | G06F 11/3419 |
| | | | | | 717/128 |
| 7,818,722 | B2 | * | 10/2010 | Cain, III | G06F 11/3466 |
| | | | | | 717/130 |
| 2009/0089805 | A1 | * | 4/2009 | Srinivasan | G06F 11/3466 |
| | | | | | 719/318 |
| 2011/0145800 | A1 | * | 6/2011 | Rao | G06F 11/323 |
| | | | | | 717/133 |

* cited by examiner

*Primary Examiner* — Ryan D. Coyer
(74) *Attorney, Agent, or Firm* — Kacvinsky Daisak Bluni PLLC

(57) ABSTRACT

The exemplary embodiments may provide an approach to finding and identifying the correlation between the invoking code and the invoked code by correlating the timestamps of contextual information of code in the invoking code and invoked code. As a result, developers have information during investigating the programs and can use the information to identify a region of interest to narrow down a performance problem in the invoking code efficiently. As a result, development productivity can be improved.

34 Claims, 21 Drawing Sheets

```
function myExample        —— 102
    foo;
    bar;
    baz;
end function foo              —— 104
    A = ones(80,80);
    B = ones(80,80);
    for i=1:1:1000
        C = myMatrixMult(A,B);   —— 112A
    end
end function bar              —— 106
    A = ones(400,400);
    B = ones(400,400);
    for i=1:1:5
        C = myMatrixMult(A,B);   —— 112B
    end
end function baz              —— 108
    s = 2400;
    A = ones(2400,2400);
    B = ones(2400,2400);
    for i=1:1:10
        C = myMatrixMult(A,B);   —— 112C
    end
end function qux              —— 110
    A = ones(80,80);
    B = ones(80,80);
    for i=1:1:1000
        C = myMatrixMult(A,B);   —— 112D
    end
end
```

100

```
#include "mex.h"
#include "math.h"

/* Matrix Multiplication with three level loops */
void naiveMatrixMult(double *x, double *y, double *z, mwSize n)   —— 122
{
    /* Skip the details */
}

/* Matrix Multiplication with cache-friendly block algorithms */
void blockedMatrixMult(double *x, double *y, double *z, mwSize n)  —— 124
{
    /* Skip the details */
}

/* Use MATLAB built-in matrix multiplication function */
void builtinMatrixMult(int nlhs, mxArray *plhs, int nrhs, const mxArray *prhs)  —— 126
{                                                                              —— 128
    /* Skip the details */
}

/* The gateway function */
void mexFunction(int nlhs, mxArray *plhs[],
                 int nrhs, const mxArray *prhs[])
{
    /* Skip the details */

/* call the computational routines based on input matrix sizes */
    if (matrix_columns <= 96)
        naiveMatrixMult(inMatrixA,inMatrixB,outMatrix,(mwSize)ncols);   —— 130
    }else if (matrix_columns <= 512){
        blockedMatrixMult(inMatrixA,inMatrixB,outMatrix,(mwSize)ncols);
    }else {                                                             —— 132
        builtinMatrixMult(nlhs, plhs, nrhs, prhs);   —— 134
    }
}
```

| Invoked Code timestamp | execution stack |
|---|---|
| 0 | myMatrixMult.mexw64!naiveMatrixMult<br>myMatrixMult.mexw64!mexFunction |
| 1 | myMatrixMult.mexw64!naiveMatrixMult<br>myMatrixMult.mexw64!mexFunction |
| 2 | myMatrixMult.mexw64!naiveMatrixMult<br>myMatrixMult.mexw64!mexFunction |

| Invoked Code timestamp | execution stack |
|---|---|
| 0 | myMatrixMult.mexw64!naiveMatrixMult<br>myMatrixMult.mexw64!mexFunction |
| 1.1 | myMatrixMult.mexw64!naiveMatrixMult<br>myMatrixMult.mexw64!mexFunction |
| 2.1 | myMatrixMult.mexw64!naiveMatrixMult<br>myMatrixMult.mexw64!mexFunction |

Invoking Code — 606

| timestamp | execution stack |
|---|---|
| 0 | anchor-entering_function |
| 0 | myExample.m>myfoo |
|   | myExample.m>myExample |
| 1 | myExample.m>myfoo |
|   | myExample.m>myExample |
| 2 | myExample.m>myfoo |
|   | myExample.m>myExample |
| 2.8 | anchor-entering_function |
| 3 | myExample.m>mybar |
|   | myExample.m>myExample |

Invoked Code — 608

| timestamp | execution stack |
|---|---|
| 0 | anchor-entering_function |
| 0 | myMatrixMult.mexw64!naiveMatrixMult |
|   | myMatrixMult.mexw64!mexFunction |
| 1.1 | myMatrixMult.mexw64!naiveMatrixMult |
|   | myMatrixMult.mexw64!mexFunction |
| 2.1 | myMatrixMult.mexw64!naiveMatrixMult |
|   | myMatrixMult.mexw64!mexFunction |
| 2.8 | anchor-entering_function |
| 3 | myMatrixMult.mexw64!blockedMatrixMult |
|   | myMatrixMult.mexw64!mexFunction |

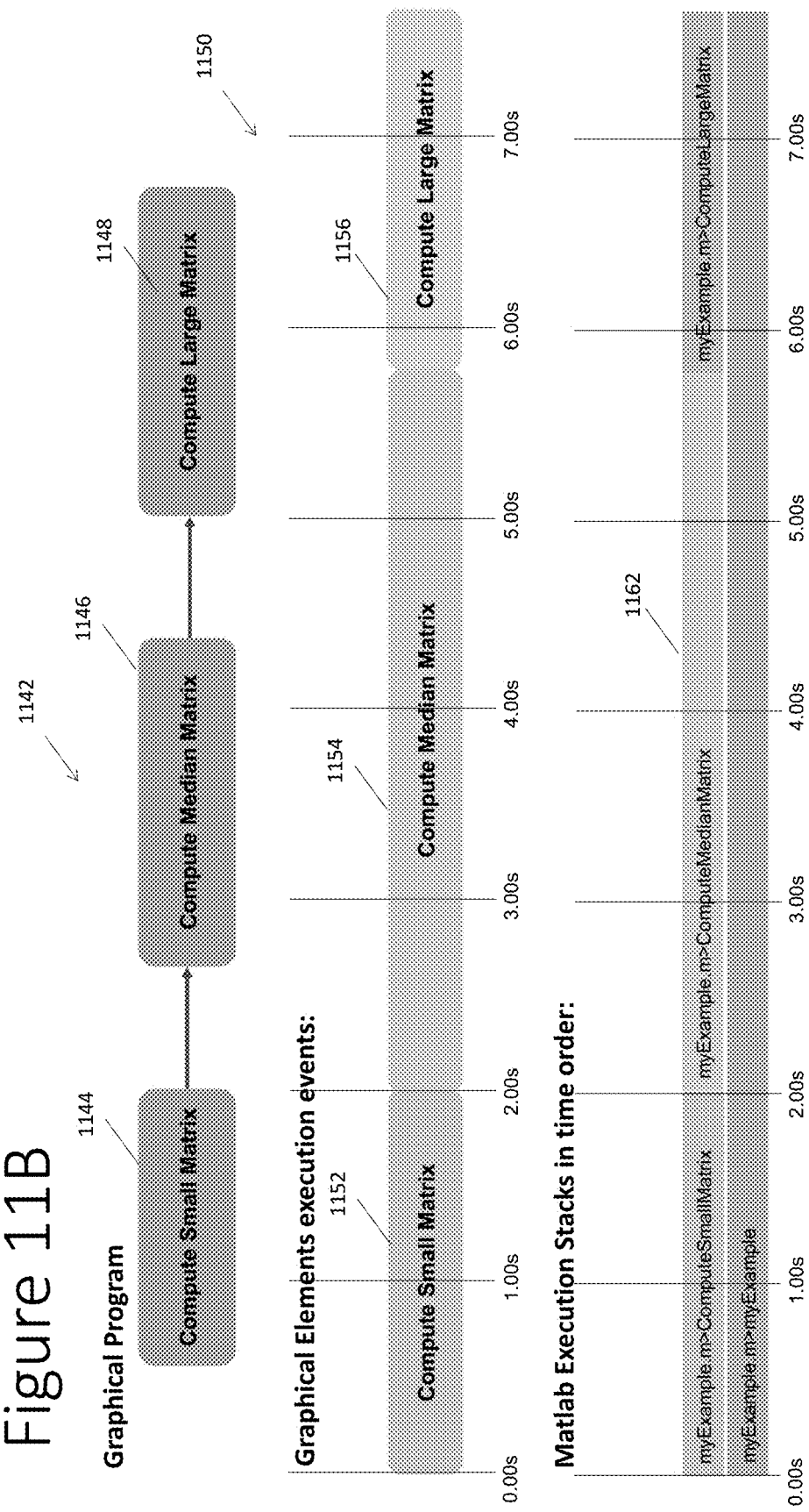

US 11,055,092 B1

CORRELATING CONTEXTUAL INFORMATION OF INVOKING CODE IN A PROGRAMMING LANGUAGE WITH CONTEXTUAL INFORMATION OF AT LEAST ONE INVOKED CODE IN A DIFFERENT PROGRAMMING LANGUAGE

SUMMARY

In accordance with an exemplary embodiment, a method is implemented by a computing device having a processor. Per the method, first code that is written in a first programming language is executed on the processor, the executing of the first code in the first programming language resulting in second code in a second programming language being executed. First contextual information regarding the first code in the first programming language is obtained at first sampled times over a time period during the executing. For each of the first sampled times, the first contextual information identifies which components in the first code are running at the sampled time. Second contextual information regarding the second code in the second programming language is obtained at second sampled times over the time period. For each of the second sampled times, the second contextual information identifies which components of the second code are executing at the sampled time. For a first component of the first code that is identified to execute for a first time period including a first starting sampled time within the first sample times and a first ending sampled time within the first sample times, one or more second components of the second code that execute for a second time period including a second starting sampled time within the second sample times and a second ending sample time within the second sample times are identified. The one or more second components are invoked by the first component during the executing of the first component. The identifying comprises determining the second starting sampled time corresponds to the first starting sampled time based on analyzing temporal order or event information of the first and second contextual information.

The displaying may include displaying graphical information on the display that identifies at least some of the components of the first code and at least some of the components of the second code that are executing for each sampled time of the time period. Timestamps may be recorded for each of the first sample times and each of the second sample times, and the timestamps may be used in the analyzing temporal order for the obtained first contextual information and the second contextual information. The first code may invoke the second code. The second code may include an invoking component that invokes an additional component in the second code. The second code may include at least one library module. The first code or the second code may include graphical code or textual code. The obtaining the first contextual information may include using a profiler for the first programming language to profile the first code to generate the first contextual information. The obtaining the second contextual information may include one of retrieving the second contextual information from a storage or invoking a profiler for the second programming language to profile the second code to generate the second contextual information and receiving the second contextual information from the profiler of the second programming language. The first contextual information and/or the second contextual information may include snapshots of an execution stack. The components may include at least one of functions, procedures, subroutines, library modules or methods. The method may use events indicative of the components starting and events indicative of the components stopping in ordering the components in the temporally ordering.

A non-transitory computer-readable storage medium may store instructions executable by a processor of a computing device to perform the above method.

In accordance with an exemplary embodiment, a method is performed by a processor of a computing device. Per the method, sampled execution contextual information at first sampling times is received from a first profiler that is profiling first code written in a first programming language and sampled execution contextual information at second sampling times is received from a second profiler that is profiling second code written in a second programming language, wherein, for each of the first sampling times and the second sampling times, the sampled execution contextual information holds information regarding what components are executing at that sampling time. The sampled execution contextual information is stored along with timestamp information for the sampled execution contextual information. The stored sampled execution contextual information and the timestamp information are processed to generate a graphical presentation that depicts what components of the first code and what components of the second code are executing along a timeline. Annotations are added to the graphical presentation, wherein the annotations are ordered per time on the timeline and provide information about activity at that time. The graphical presentation is displayed on a display device with the annotations. A non-transitory computer-readable storage medium may store instructions executable by a processor of a computing device to perform this method.

The annotations may be event markers reflecting when events occur along the timeline. The annotations may reflect measured metrics information. The measured metrics information may be memory usage information or processor usage information at the sampling times. Each annotation may reflect what graphical modeling component is executing or being simulated. The annotations may identify what graphical programming constructs are executing.

BRIEF DESCRIPTION OF THE DRAWINGS

FIG. 1 depicts an example of illustrative invoking code and invoked code.

FIG. 6B illustrates another example of contextual information in the form of execution stacks and timestamps for invoked code.

FIG. 6C illustrates an example of contextual information in the form of execution stacks for invoked code where the timestamps are offset relative to the timestamps of the invoking code.

FIG. 6D illustrates an example of contextual information in the form of execution stacks where anchors are used.

FIG. 11B depicts an illustrative presentation of example graphical components and example invoked textual code along a timeline.

DETAILED DESCRIPTION

Figure 2:
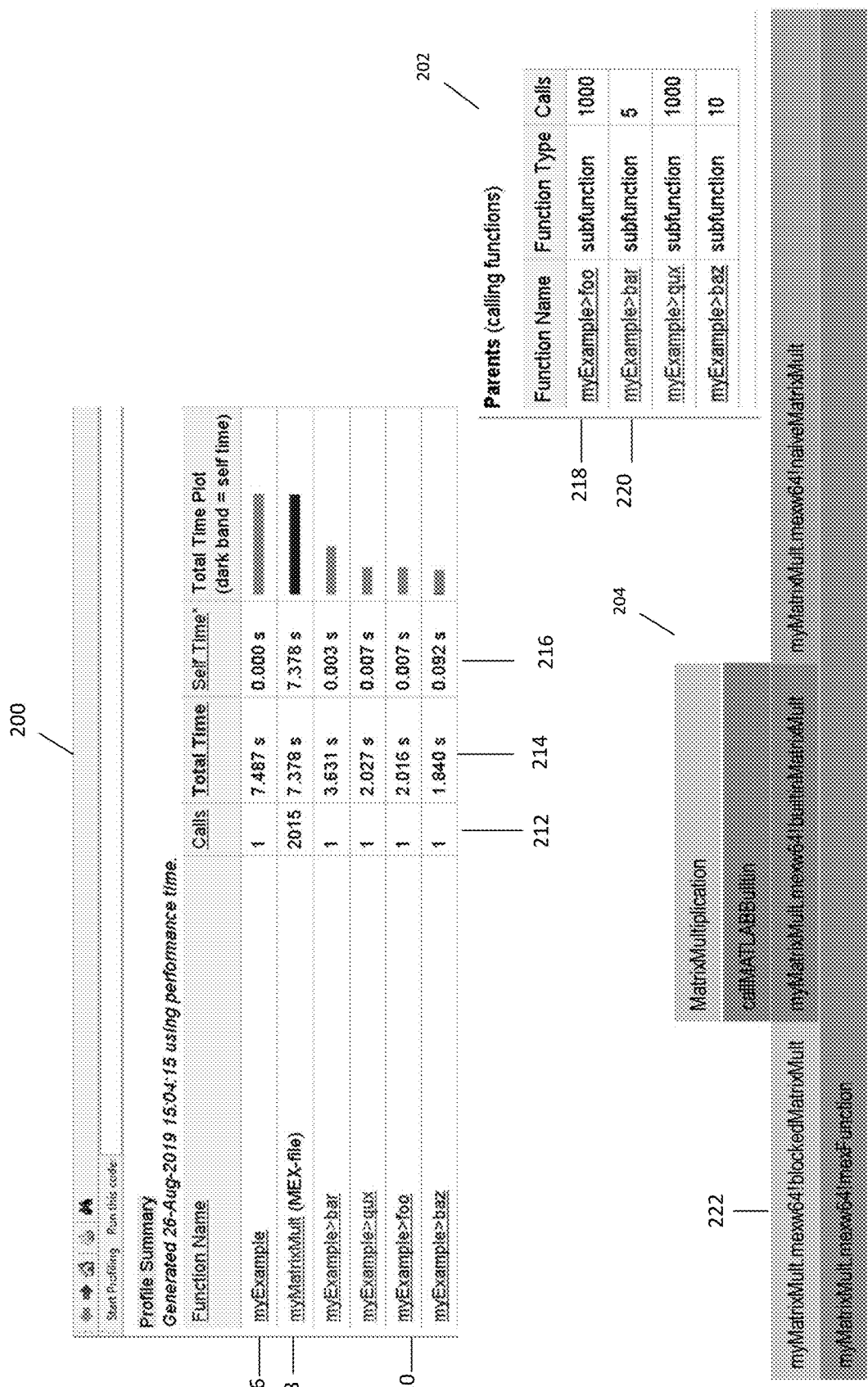
FIG. 2 depicts an example of profiling information of invoking code and a flame graph for the invoked code of FIG. 1.

Some programming languages (such as MATLAB, Python, R, etc.) provide an easy to understand syntax for users to construct their programs efficiently without needing to know certain details, such as garbage collection, CPU architectures, dynamic type checking, etc. Programs written in such programming languages cannot be executed by operating systems directly. Instead, the programs access the services of a managed runtime environment for execution. Typically, with a managed runtime environment, when a user runs a program (such as MATLAB code, for example), an interpreter or a Just-In-Time compiler interprets or compiles the programming language code of the program into executables. This process takes place under control of the managed runtime environment. The managed runtime environment provides pre-compiled libraries and modules that can be called during the execution of the programming language code. The managed runtime environment is written in a different programming language than the programming language code of the program. The programming language in which the managed runtime environment is written is suitable for handling low-level operations (I/O, memory management, etc.) efficiently. For example, the managed runtime environment can be written in the C or C++ programming languages. In the above example, MATLAB is the invoking language and the managed runtime environment written in C/C++ is the invoked language.

It is beneficial for developers to know the runtime correlation between the invoking code (for example, MATLAB) and the invoked code (for example, C and C++) during the development of programs to achieve a better understanding of the program behaviors. By just looking at the invoking code, developers do not gain information about the functions and libraries that are invoked during the execution. When invoking code shows performance regression, developers cannot just examine the invoking code and identify the changes made in the managed runtime environment that cause this performance issue. By just examining the invoked code (e.g., C and C++ code), developers do not know about how these invoked code functions are used in the invoking code. As a result, knowing the correlation between the contextual information of the invoking/invoked code increases the productivity of debugging and developing.

To understand the correlation between the invoking code and the invoked code, developers conventionally need to configure debuggers and walk through the invoking code and invoked code step-by-step or use an invoked programming language profiler to collect profile data on an invoking code snippet. This manual process is very inefficient and is not scalable for analyzing large programs.

The exemplary embodiments described herein may provide an approach to finding and identifying the correlation between the invoking code and the invoked code by correlating the timestamps of contextual information of code in the invoking code and invoked code. As a result, developers have information during investigating the programs and can use the information to identify a region of interest to narrow down a performance problem in the invoking code efficiently. As a result, development productivity can be improved.

Exemplary embodiments may use timestamps to correlate contextual information regarding invoking code in an invoking programming language with contextual information from one or more pieces of invoked code in a different invoked programming language. The contextual information may include information such as timestamps, call stack snapshots, events, performance metrics, and other information that is of interest to a developer. The contextual information may be gathered by profilers or other instrumentation mechanisms. The contextual information may identify what components in the invoking code and what components in the one or more pieces of invoked code are executing at various points in execution time. Components of invoking or invoked code may include libraries, modules, files, functions, statements, graphical models or other referenceable invocable units of code. The correlation reveals the relationship between the components in the invoking code and the components in the invoked code. A graphical presentation of the components in the invoking code and components in the one or more pieces of invoked code in execution order may be generated. A textual report which summarizes the correlation between the components in the invoking code and components in the one or more pieces of invoked code may also be generated. The correlation and presentation of the components can be established based on time information, in a timeline of program execution. The correlation and presentation can allow a developer to better understand what components of the invoking code and what corresponding components of the invoked code are running at points in the execution time. Moreover, a developer may gain a better understanding of what components in the invoked code are invoked responsive to execution of the components of the invoking code. The correlation and the presentation are helpful in allowing a developer to easily understand how a program is executed in the multi-language implementations. For example, one possible use of this information is to select a code snippet for debugging or identify the root cause of performance issues. The exemplary embodiments may be especially useful when analyzing large programs. It is not feasible to analyze such large programs manually where often more than hundreds of functions and more than thousands line of code are involved. It is impractical to manually slice the program for investigation and repeat this process many times until find the root-cause.

Correlation can also be established based on other contextual information, such as events. In some implementations, events can be external (e.g., a mouse click). In some implementations, events can be internal (e.g., an internal interrupt or a start of a particular simulation phase). In another example, correlation can be established based on performance metrics, such as memory usage, execution time, disk usage, network traffic, etc.

In some implementations, events and performance metrics may have associated temporal information, e.g., timestamps, and the temporal information may be used to position the events and performance metrics in relation to the execution timeline of the components of the invoking code and the invoked code. Indicators of the events and/or information, such as performance metrics, may appear in the presentation of the components on a timeline. Thus, a developer may better understand the relationship between specific events, performance metrics and components (invoking and/or invoked) that are executing. In addition, a developer may better appreciate a time order of events and performance metrics relative to component execution.

FIG. 1 depicts an example of invoking code 100 and invoked code 120 on which the disclosed embodiments can apply to provide users with insights on the correlation, e.g., runtime correlation, between multiple languages implemented by the code 100, 120. The invoking code 100 is in an invoking programming language. In this case, the invoking programming language is the MATLAB programming language, although the description can apply to other programming languages. The invoking code includes various components, such as libraries, modules, files, functions, statements, graphical models or other referenceable invocable units of code. An example component in the invoking code is the function myExample. The function myExample 102 calls three other functions foo 104, bar 106 and baz 108. Each of these functions 104, 106 and 108 defines matrices A and B to be of a different size. For example, foo 104 defines the matrices to be 80 by 80, whereas bar 106 defines the matrices to be 400 by 400 and baz 108 defines the matrices to be 2400 by 2400. Each of the functions 104, 106 and 108 includes a respective call 112A, 112B and 112C to the myMatrixMult function to multiply the matrices A and B. The bar function 106 invokes the qux function 110, which defines the matrices A and B to be 80 by 80 and includes a call 112D to the myMatrixMult function to multiply the matrices A and B.

The invoked code 120 is for myMatrixMult function in this example. The code in the invoked code is written in C and executes in response to the calls 112A, 112B, 112C and 112D in the invoking code 100. The invoked code 120 includes various components. For example, the invoked code includes three functions naiveMatrixMult 122, blockedMatrixMult 124 and builtinMatrixMult 126. The invoked code also includes a gateway function mexFunction 128 that executes when a call to myMatrixMult is made. The role of the mexFunction 128 is to decide which of the other functions 122, 124 and 126 to use to perform the matrix multiplication. If the number of columns of the matrices being multiplied is less than or equal to 96, then the naiveMatrixMult function 122 is called (see line 130). If the number of columns of the matrices being multiplied is greater than 96 but less than or equal to 512, the blockedMatrixMult function 124 is called (see line 132). If the matrices to be multiplied include more than 512 columns, the builtinMatrixMult function 126 is called (see line 134).

In some implementations, a user who programmed invoking code 100 may not be aware of the implementation of the function myMatrixMult in invoked code 120. During execution of the invoked code 120, it may not be known or apparent to the user which of the three matrix multiplication functions is called. Moreover, it may not be apparent what the relative time order of execution of the functions 104, 106, 108 and 110 in the invoked code is relative to the functions 122, 124, and 126 of the invoked code 120. Still further, it may not be apparent how long each function 122, 124, and 126 runs.

To illustrate why a user wants to know the correlation between the invoking code 100 and the invoked code 120 it is worth considering an exemplary scenario. When the invoking code 100 is executed, a user may see unexpected performance slowdown on some microprocessor architectures because different architectures have different memory hierarchies. To understand the performance slowdown, the user wants to understand the correlation between the invoking code 100 and invoked code 120. Once the user knows how the calls 112A-D are executed, the user may realize that the thresholds used in code 128 need to be modified based on the target system's memory hierarchy. Then, the user may adjust the thresholds in code 128 to dispatch code 122, code 124, and code 126 properly based on the targeted microprocessor architectures. The traditional way to understand the relationship between invoking code and invoked code is by tracing the function and statements manually. Although this manual approach is a feasible approach for analyzing a small program, the manual approach is not a feasible approach for analyzing large programs.

Furthermore, in multi-language execution environments, a program may be constructed using more than two languages. For example, MATLAB code can invoke Python code, and then the Python code can invoke C code. As another example, the invoking code may directly invoke code in multiple programming languages. For instance, invoking code may invoke a function in programming language "A" and another function in programming language "B". The multiple layers of invoking and invoked code make the manual analysis even more difficult in such a case than in cases where a single invoking code invokes a single invoked code.

To provide insights into runtime performance to help a user of invoking code 100 to understand the execution time of each function's code 102, 104, 105, 108, contextual information can be gathered during execution of the invoking code 100 and invoked code 120. FIG. 2 depicts an example of information available for the invoking code 100 and the invoked code 120. FIG. 2 shows profile information 200 for invoking code 100, profile information 202 for the child functions of myMatrixMult 208, and a flamegraph 204 for code 200. In some implementations, the profile information 200 and 202 is produced by a single profiler. In this example case, the profiler is the MATLAB profiler. The profile information can include function name, the number of calls of this function, total execution time and self execution time of this function. The profile information 200 for code 100 can be presented in a tabular form where each row is associated with a function. For instance, row 206 is for the myExample function. However, how the information is presented does not affect the implementations of this disclosure. Other presentation formats (e.g., call graphs) can also be used. There is a column 212 that lists the number of times the function is called. The myExample function is called only once. There also is a column 214 that lists the total time that the function is executing (e.g., 7.487 secs) and a column 216 that specifies the self execution time for the function (0 secs, as it is negligible). There is a row 208 for the myMatrixMult function and rows 210 for the functions foo, bar, baz and qux.

The profiler may also produce performance information as part of the profile information 202 relating to function 208, myMatrixMult. In this illustrative case, the functions foo, bar, baz and qux in the invoking code are listed as child functions to 208, myMatrixMult. Each row 218, lists the function name, function type and number of calls the associated function makes to other functions.

The profile information for code 120 may be presented graphically, e.g., in a flamegraph 204. The flamegraph 204 is for the invoked code and depicts the state of the execution stack for the invoked code over elapsed time during execution. Each rectangular box is a function in the stack. The x-axis shows the execution time for the call stacks. The left to right ordering does not reflect the execution order of these call stacks. The y-axis shows call stacks. The caller is at the bottom of the stack, and the callee is at the top of the stack. The topmost box represents the function that is consuming the CPU cycle. Every function beneath that is an ancestor of the function of the topmost box. For example, box 224 represents the mexFunction which is the parent function. A box 222 is on top of box 224, and this means mexFunction calls blockedMatrixMult during the execution. The function mexFunction also calls naiveMatrixMult and builtinMatrixMult.

To understand the relationship between invoking code 100 and invoked code 120 and to provide insights on runtime performance, it is beneficial to understand how functions in invoking code 100 invoke functions in invoked code 120. For example, it is useful to know function 104 invokes function 122, function 106 invokes function 124, and function 108 invokes function 126. However, as can be seen from FIG. 2, manually correlating the contextual information 200 and 202 for MATLAB code 100 with the flamegraph 204 for C code 120 can be difficult. For example, a developer cannot tell how functions of the MATLAB code 100 are actually invoking the functions of the C code 120 directly from the profile information.

Figure 3:
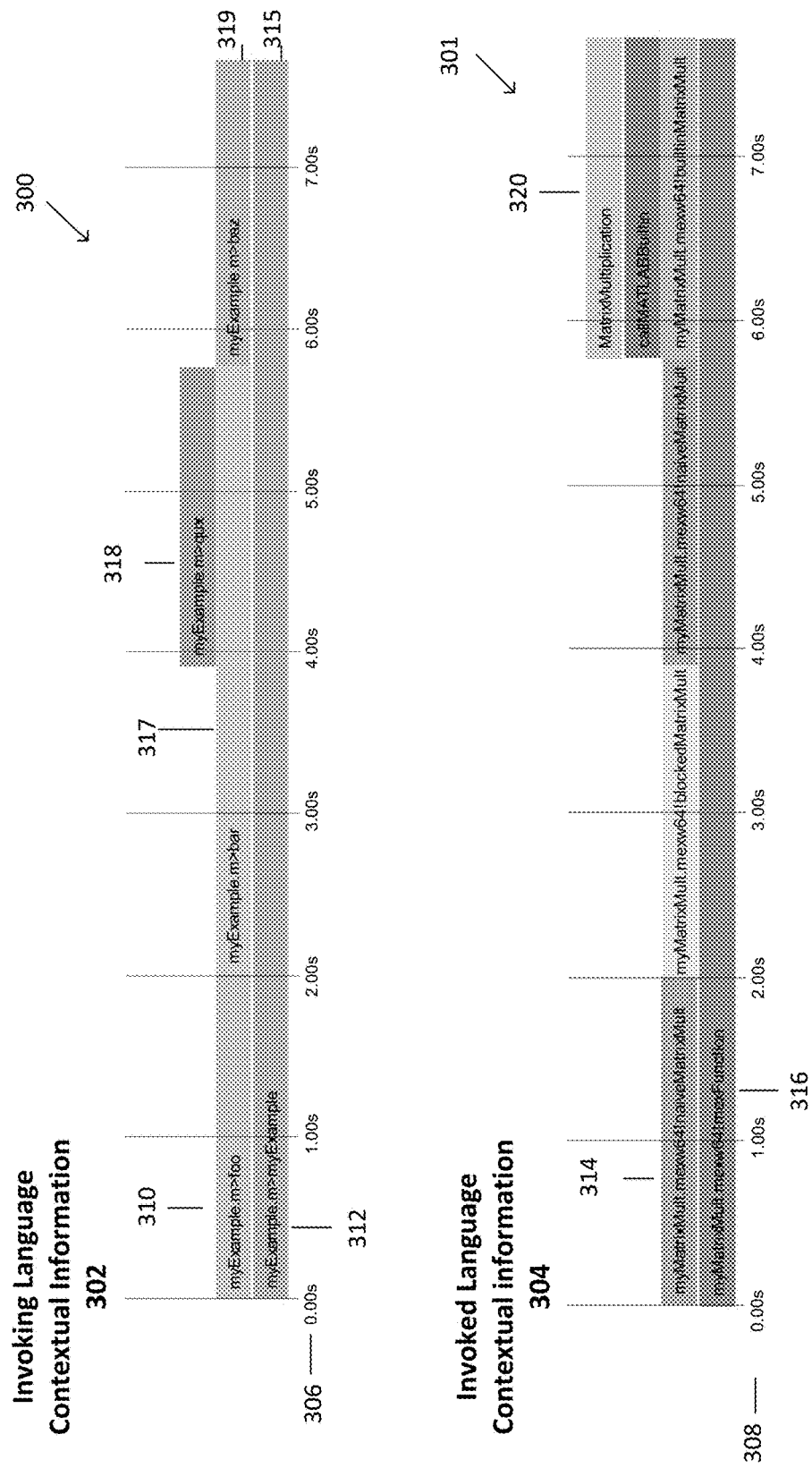
FIG. 3 depicts an illustrative presentation of the correlated contextual information along the timeline between the invoking code and invoked code of FIG. 1 for an exemplary embodiment.

Exemplary embodiments may correlate contextual information for invoking code 100 and contextual information for invoked code 120 to provide the mapping between invoking code 100 and invoked code 120. The contextual information is not limited to functions only. FIG. 3 shows function mapping to illustrate the ideas and is not intended to be limiting. Based on the contextual information, components that execute may be arranged in accordance with execution order along a timeline. FIG. 3 depicts an example of the execution order for functions of the invoking code 302 and execution order for functions of the invoked code 304 of FIG. 1. The presentation 300 of the invoking code components shows graphical boxes that depict when the execution of a component starts, and when the execution of the component ends. For example, box 312 is for the myExample function. A timeline 306 is provided to identify the time of the execution. The vertical position of the boxes identifies the position in the execution stack. The caller function is positioned beneath the callee function in the depiction. The execution stack can be read from bottom to top to understand the calling sequence of the components depicted. Thus, the position of box 310 on top of the box 312 for the myExample function indicates that the function foo is called by the function myExample. Similarly, box 318 for the function qux is positioned at a high vertical position, given that box 318 is associated with the function qux, which is called by the function bar (see box 317), which in turn is called by the myExample function (see bar 312)

The presentation 301 of the invoked code components 304 also includes boxes and a timeline 308 for the invoked code components. Hence, there is a box 314 for the naiveMatrixMult function and a box 316 for the mexFunction. The presentation 301 also shows box 320, which concerns an invocation of MatrixMultiplication function.

The presentations may be configured to show the execution order of the components in different programming languages. Hence, a user can determine what components of the invoking code are executing and what components of the invoked code are executing at a given execution time. In FIG. 3, between 0 seconds and 1 seconds of the execution time, boxes 310 and 312 indicate that the foo function and the myExample function (which calls the foo function) of the invoking code components 302 are executing while boxes 314 and 316 indicate that the naiveMatrixMult function which is called by the mexFunction are executing in the same time interval in the invoked code components. Between time 2 seconds and 3.9 seconds, boxes 317 and 315 indicates that the bar function is called by myExample function, and the bar function is invoking the blockedMatrixMult function called by mexFunction in the invoked code components. Between time 3.9 seconds and 5.8 seconds, boxes 318, 317, and 315 indicates that the qux function is called by bar function called by myExample function, and the qux function is invoking the naiveMatrixMult function called by mexFunction in the invoked code components. Lastly, between time 5.8 seconds and 7.6 seconds, boxes 315, and 319 indicates that the baz function is called by myExample function, and the baz function is invoking the MatrixMultiplication function 320 in the invoked code components 304.

The graphical presentation in FIG. 3 depicts the relationship between invoking code 100 and invoked code 120. This kind of correlation relationship cannot be obtained by using the traditional profile information as shown in FIG. 2, especially for large applications.

It should be appreciated that depiction of the user interface in FIG. 3 is intended to be merely illustrative and not limiting. The bars need not be colored and can be visually distinguished from each other in different ways. In addition, the execution order need not be depicted in a horizontally oriented sequence but can be depicted a vertical sequential order or in other orientations that depict the sequence. The timelines 306 and 308 need not be aligned and need not be the same. Moreover, the timelines 306 and 308 need not use a linear scale but can show other scales. Still further, the timelines need not be uniform but can be non-uniform, such as a timeline where time 0 to 10 seconds is compressed in a single time unit and each second thereafter has its own time unit. In addition, the displayed sequencing need not be particular to time units but can be sequenced relative to events in an event sequence. Suitable display techniques can be used.

Figure 4:
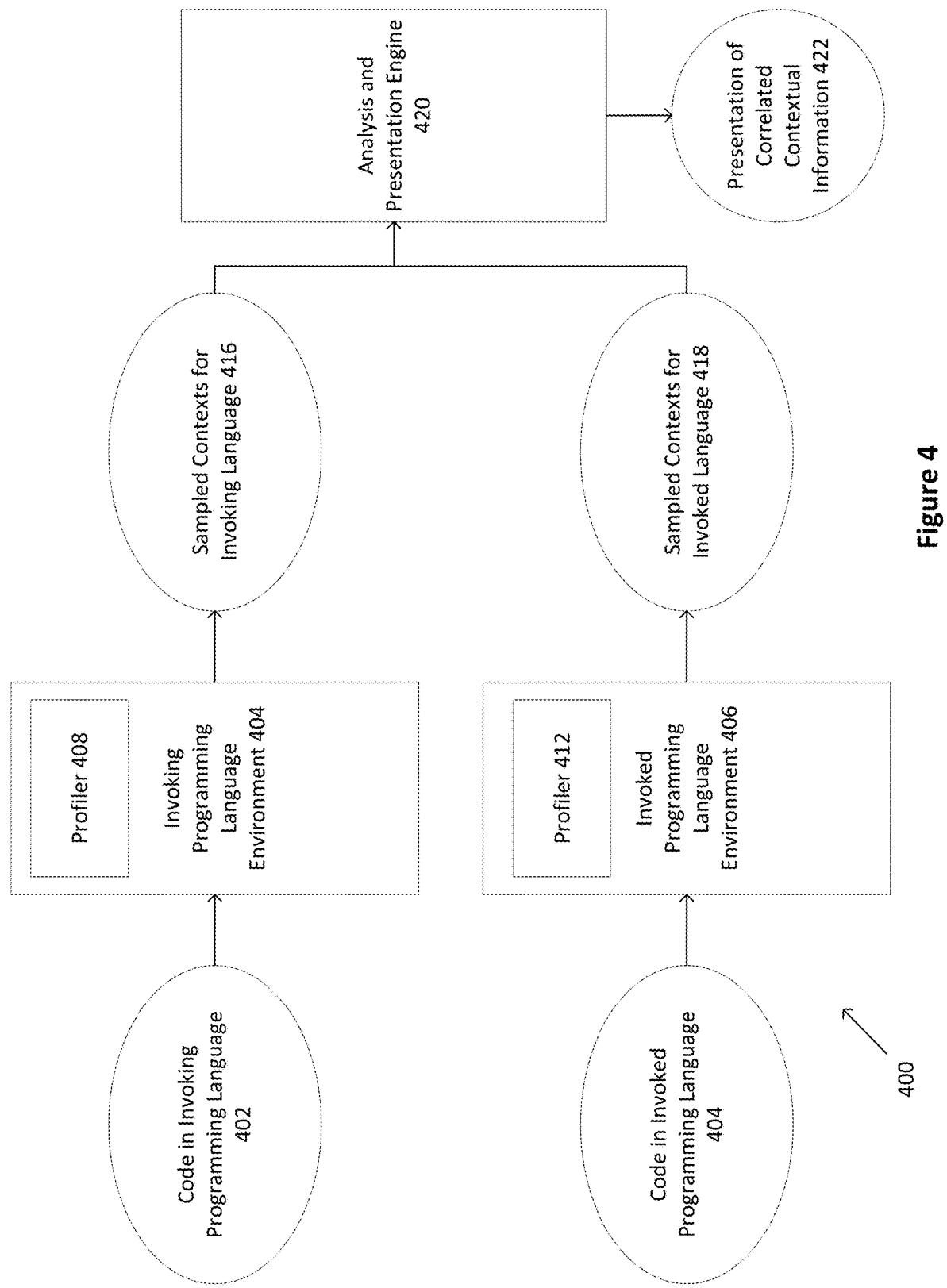
FIG. 4 depicts an illustrative flow of information among components in an exemplary embodiment.

FIG. 4 depicts a diagram showing an example of components and the flow of information in an exemplary embodiment. Although FIG. 4 depicts collecting contextual information from two programming languages, it should be appreciated that the exemplary embodiments may correlate contextual information from more than two programming languages. The invoking code in an invoking programming language 402 is executed and profiled in an invoking programming language environment 404. For the example depicted in FIGS. 1-3, the invoking code 100 is run and profiled in a MATLAB programming environment.

The invoked code in the invoked programming language 404 is executed and profiled by an invoked programming language environment 406. In the example of FIGS. 1-3, the invoked code 120 in the invoked programming language is written in the C programming language and is executed and profiled in a C programming language environment.

The profilers 408 and 412 may be responsible for profiling the invoking code 402 and invoked code 404, respectively. The profilers 408 and 412 may be sampling profilers. The profiler 408 and 412 may be two standalone profilers that collect the contextual information of the invoking code and the invoked code separately. In this scenario, the timestamps of the contextual information of the invoking code and the timestamps of the contextual information of the invoked code might not be aligned on the time line, The profilers 408 and 412 may also be one unified profiler which collects the contextual information of the invoking code and the contextual information of the invoked code at the same time. In this scenario, the timestamps of the invoking code and the timestamps of the invoked code may be aligned on the timeline.

Figure 5:
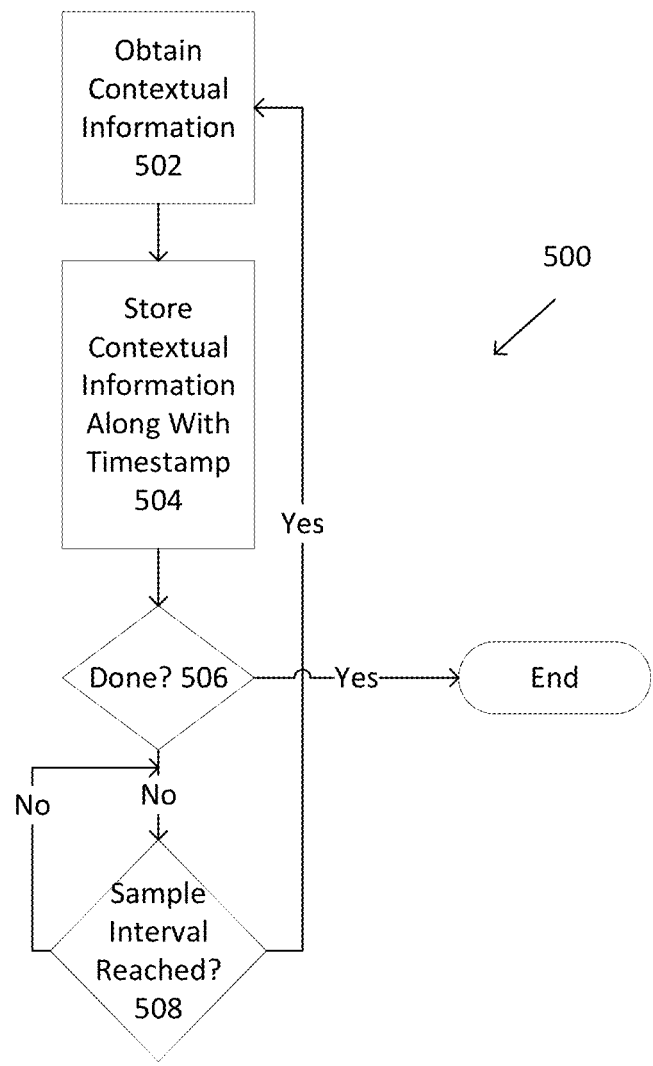
FIG. 5 depicts example steps taken in obtaining contextual information.

FIG. 5 depicts a flowchart 500 illustrating steps that may be performed in performing the profiling. At each designated time, the profiler obtains contextual information regarding programming language code as the programming language code is executing (502). In some instances, this may entail taking a snapshot of the execution stack. The snapshot may hold contextual information, such as an execution stack or information in the execution stack regarding components, like libraries, functions, modules, files, statements, etc., with its associated timestamp. In other instances, the information collected by the profiler is not limited to the execution stack. For example, events indicating the execution of a component and times at which these events occur may be included in the contextual information. Still further, the occurrence of certain other events may be noted in the contextual information. The contextual information and the timestamp are stored in a storage (504). A check is made whether the process is complete (506). If so, the contextual information and timestamps been gathered and stored. If not, the process is repeated beginning at (502) once a next sampling period is reached (508). The sampling period may be constant of variable. For example, it may be desirable to sample more frequently at periods of interest (such as at startup) to obtain finer grain information.

The collected contextual information for the invoking language 416 and the collected contextual information for the invoked language are passed to an analysis and presentation engine 420. The analysis and presentation engine analyzes the collected contextual information for the invoking language 416 and the collected contextual information for the invoked language 418 to produce the correlations and may generate presentations of the correlations 422 (see FIG. 3) as discussed above. The analysis and presentation engine may be realized in software as one or more programs, modules or the like.

Figure 6A:
FIG. 6A illustrates an example of contextual information in the form of execution stacks and timestamps for invoking code.

FIG. 6A shows an example of some contextual information 600 for the example of FIG. 1 for the invoking code 100. FIG. 6B shows an example of some contextual information 602 for the invoked code 120. The contextual information 600 include a first MATLAB execution stack with an associated timestamp 0, a second MATLAB execution stack with an associated timestamp 1, and a third MATLAB execution stack with an associated timestamp 2. The contextual information 602 of FIG. 6B include a first C execution stack with an associated timestamp 0, a second C execution stack with an associated timestamp 1, and a third C execution stack with an associated timestamp 2. In this example, the timestamp of the first execution stack in both 600 and 602 are adjusted to 0, so the execution stacks of 600 and 602 are aligned at the first timestamp. The rest of timestamps of the execution stacks are also adjusted by using the same offset. Hence, they can be aligned on the timeline which starts at 0. This is an example which shows how to align the execution stacks collected on different languages by using timestamps. The exemplary embodiments are not limited to this method.

Figure 7A:
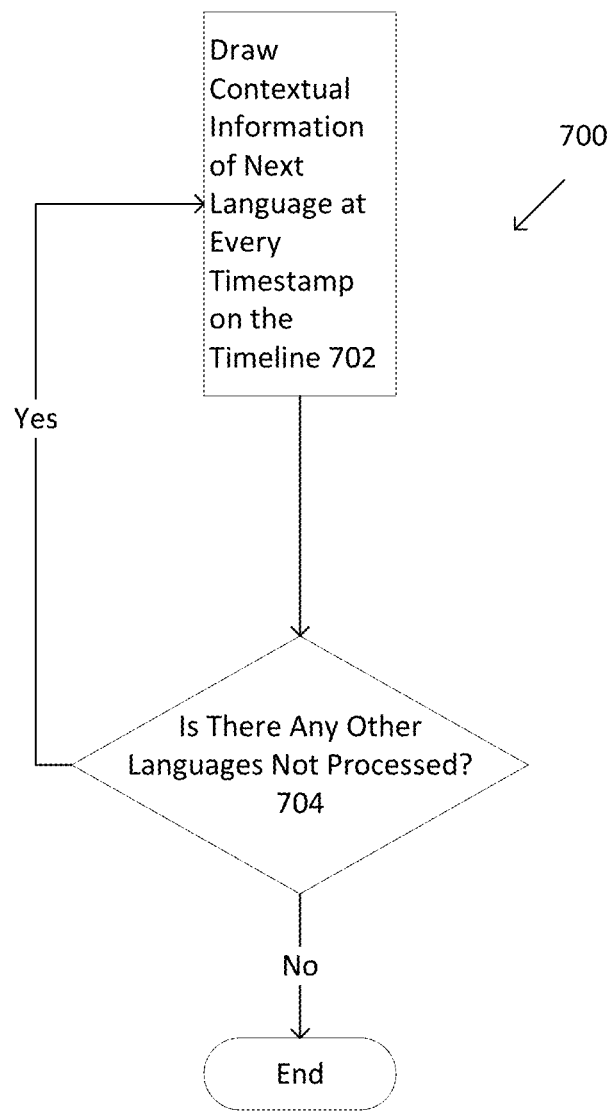
FIG. 7A depicts a flowchart showing an example of how timestamps may be used to arrange the execution stacks in the execution order on the timeline.
Figure 8A:
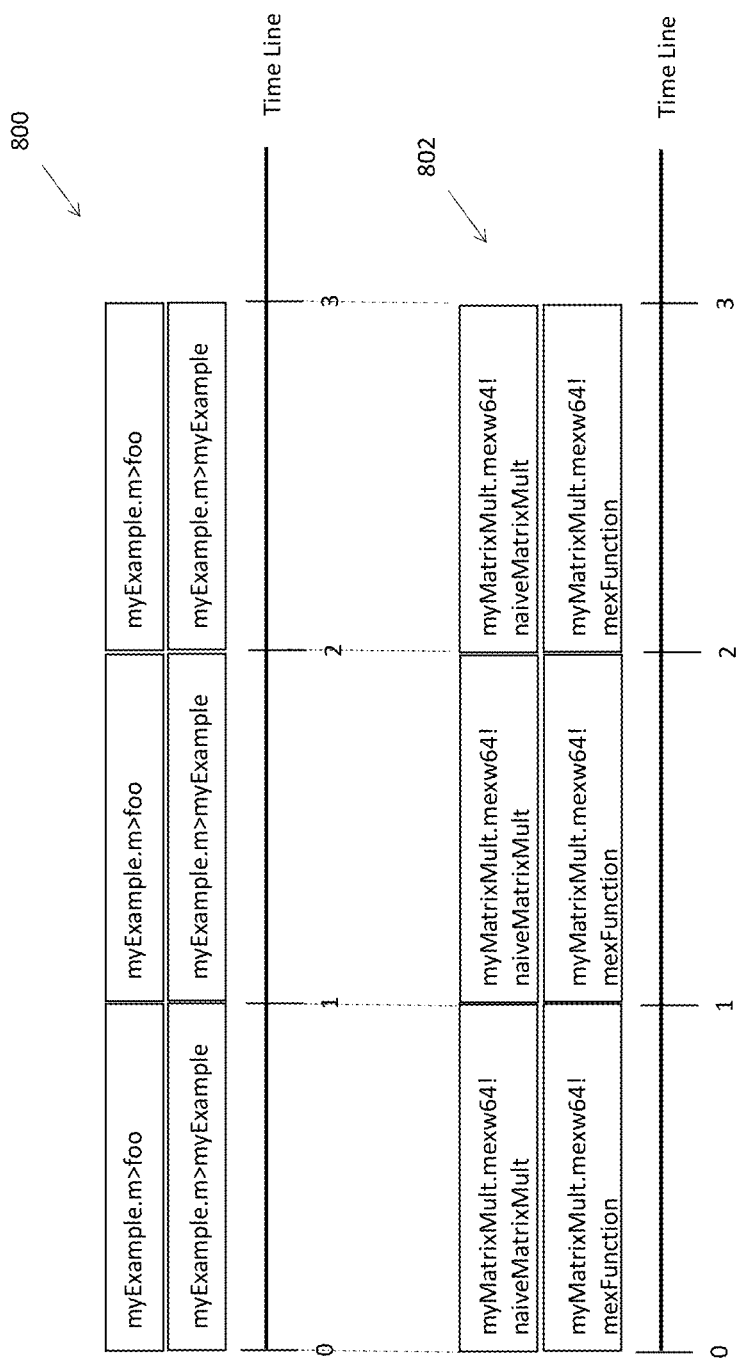
FIG. 8A depicts a graphical presentation showing example execution stacks for example invoking code and example execution stacks for example invoked code on timelines.

FIG. 7A depicts a flowchart 700 showing how the timestamps may be used to arrange the execution stacks in the execution order on the timeline in the analysis and presentation engine 420. FIG. 8A depicts a graphical presentation that may be generated. First, the analysis and presentation engine 420 gets the contextual information 600 of the invoking code 100 and arranges each execution stack at its own timestamp along the timeline 702. The graphical presentation of the components of the invoking code 100 is shown as 800. Then, the analysis and presentation engine 420 checks if there is any contextual information collected on the other programming language 704. In this example, there is another language. The engine gets the contextual information 602 of the invoked code 120 and arranges contextual information for the execution along the timeline based on the associated timestamp for the snapshot of the execution stack. The graphical presentation for the components of the invoked code 120 is shown in 802. FIG. 8A depicts the final graphical presentation, where 800 and 802 are correlated at the start time 0.

Figure 8B:
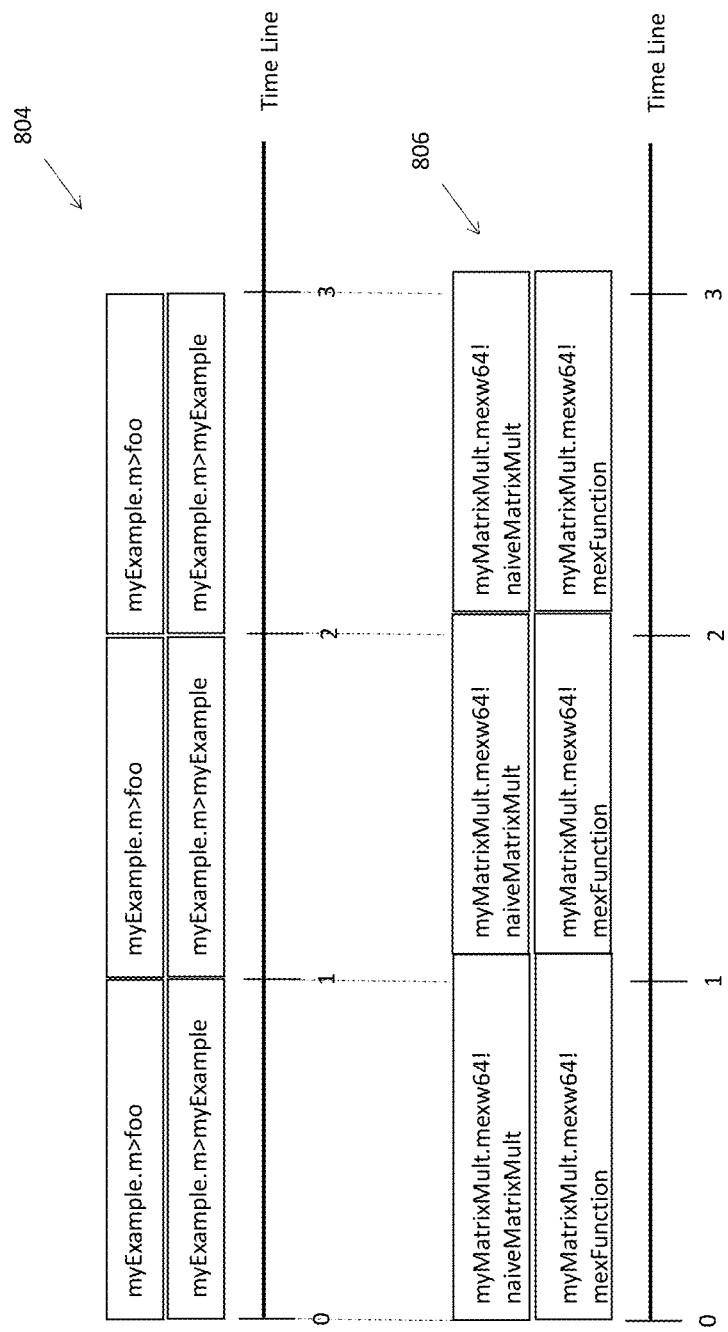
FIG. 8B depicts a graphical presentation showing example execution stacks for example invoking code and example execution stacks for example invoked code on timelines where the start and end times of some functions in the invoked code are offset relative to the start and end times of the functions of the invoking code.
Figure 9:
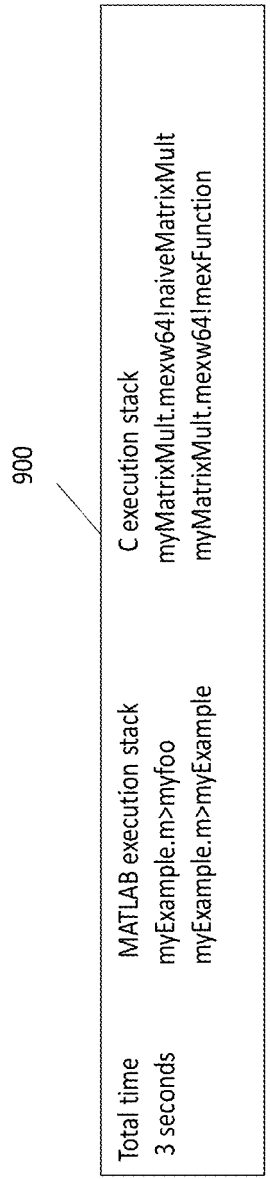
FIG. 9 depicts an example of an example textual report of information regarding the execution time for invoking code components and invoked code components.

In this example, the execution stacks of the invoking code 100 and the invoked code 120 are aligned well at each timestamp. This graphical presentation enabled developers to know the correlation between the invoking code 100 and the invoked code 120 by analyzing information along the timeline. The graphical presentation is one way to view the correlated data. A textual report can be generated based on the correlated data. FIG. 9 depicts a possible textual report 900. The first column in the textual report 900 is the total execution time of the bottommost invoking code component (See FIG. 8B), the second column is the execution stacks of the invoking code, and the third column is the call stacks of the invoked code. In this example, the reports says the MATLAB execution stack (myExample.m>myExample; myExample.m>foo) invokes C execution stack (myMatrixMult.mexw64!mexFunction; myMatrixMult.mexw64!naiveMatrixMult), and the total execution time of the invoking/invoked code is 3 seconds. This example of FIG. 9 illustrates a possible textual report and is not intended to be limiting.

When the profilers 408 and 412 are two standalone profilers that collect the contextual information of the invoking code and the invoked code independently, the timestamps of the execution stacks of the invoking code and invoked code may not be identical, as shown in FIG. 6C. In this example, the timestamps of the second and third execution stacks of the invoked code are 0.1 seconds later than the invoking code 604. FIG. 8B is the graphical presentation of this example. The invoking code and the invoked code are not aligned well as can be seen in their respective representations 804 and 806. However, timestamps still provide correlation information between invoking code and invoked code. The correlated information is precise enough for using in practice.

One way to generate correlation, with the mis-alignment described above, is to also record anchors for correlating the execution stacks in the graphical presentations. One possible anchor could be recorded when the invoking code enters a function. The execution engine of the invoking code sends a signal to the profiler of the invoking code and the profiler of the invoked code to record this anchor. FIG. 6D shows the possible recorded contextual information for the invoking code 606 and the recorded contextual information for the invoked code 608 in that case. There is the anchor-entering _function. This anchor has its own timestamp. Such anchors may serve as precise function boundaries of invoking code to correlate, e.g., align, the contextual information in the form of execution stacks of the invoked code. Hence, the execution stacks of the invoked code within this function boundary are invoked by the invoking code when executing the function, and correlations between execution of the invoked code and the invoking code can be established.

Figure 7B:
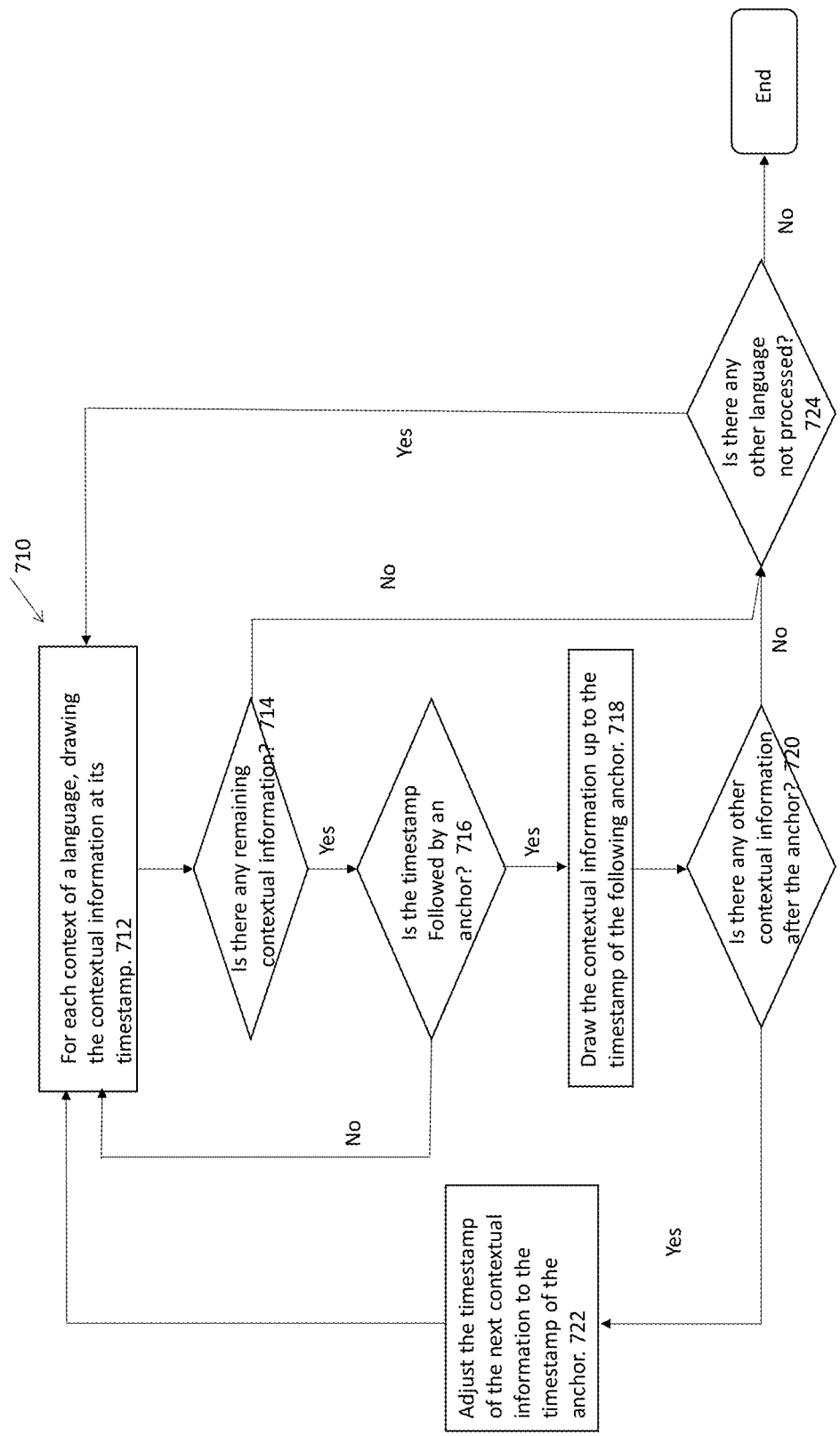
FIG. 7B depicts a flowchart which shows an example of how to arrange the execution stacks along the timeline of a presentation by using anchors.

FIG. 7B depicts a flowchart 710 which shows how to arrange and correlate the execution stacks of different code (e.g., invoked and invoking) along the timeline of a presentation using anchors. The execution stacks are arranged on the timeline of the presentation based on their timestamps 712. If there are no more execution stacks to arrange 714, a check is made whether there is contextual information of other programming languages that has not been arranged 724. If there are more execution stacks to arrange, the process moves to the next programming language and repeats beginning at 712. Otherwise, if the next execution stacks are followed by an anchor 716. The boxes for that execution stack are drawn up to the timestamp of that anchor in the presentation 718. If there are any remaining execution stacks 720, the timestamp of the first execution stack which follows the anchor is adjusted to the timestamp of the anchor 722. Otherwise, there are no remaining execution stacks of the current processing language, and the analysis and presentation engine 420 check if there is contextual information of other programming languages that has not been arranged 724. If the execution stacks of the invoking code and the invoked code are drawn 724, the graphical presentation is finished. It should be appreciated that the process of FIG. 7B is not limited to execution stacks but more generally is applicable to contextual information having associated timestamps. The reference to execution stacks is intended to merely illustrative and not limiting.

Figure 8C:
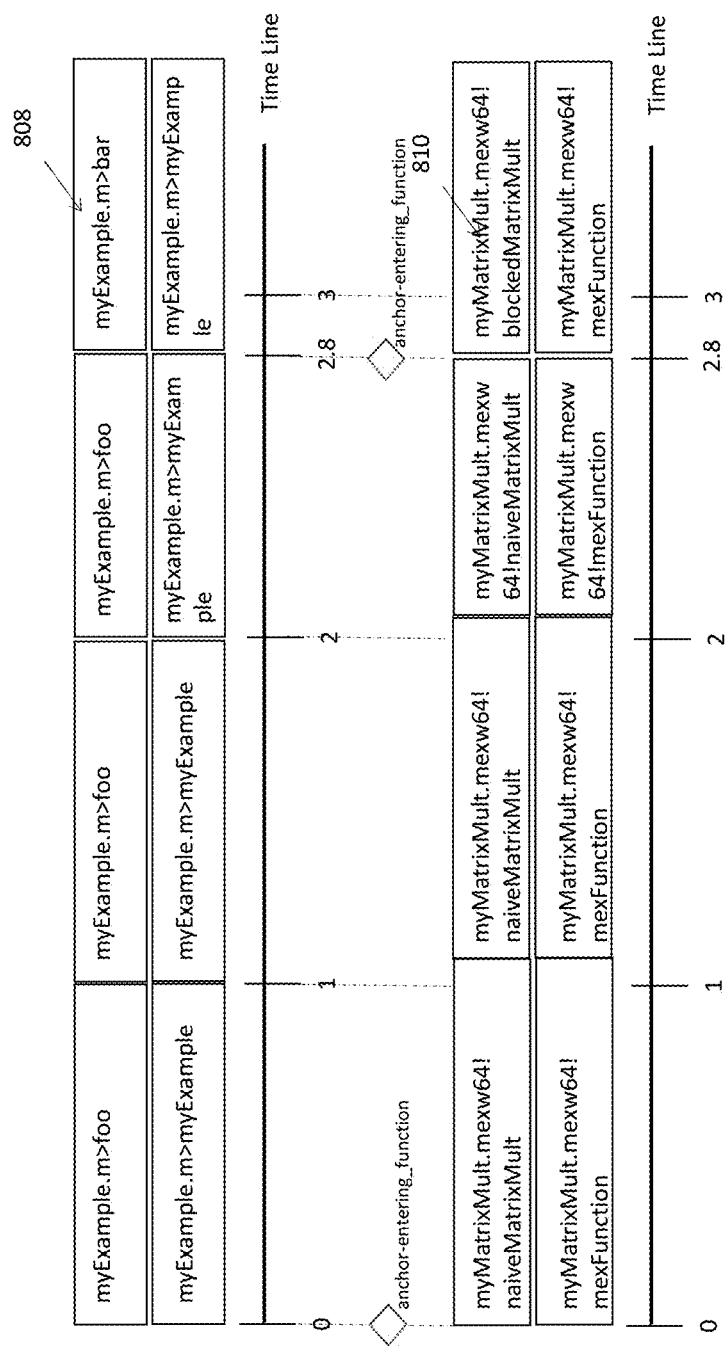
FIG. 8C depicts a graphical presentation showing example execution stacks for example invoking code and example execution stacks for example invoked code where anchoring functions are used.

FIG. 8C shows the possible graphical presentation that results from applying the process of FIG. 7B with the contextual information of FIG. 6D. The presentation includes boxes for components on the execution stack for the invoking code 808 on a timeline and boxes for components of the execution stack for the invoked code 810 on a timeline. As can be seen, the invoking code, foo function, starts at 0 second and ends at the 2.8 seconds because of the anchor-entering Junction, provides the function boundary information. The invoking code (foo) and the invoked code (naiveMatrixMult) are drawn inside this interval. Starting at 2.8 seconds, the invoking code (bar) and the invoked code (naiveMatrixMult) are drawn on the time line. Hence, the invoking code and the invoked code can be correlated, e.g., aligned, at the function boundaries.

Using anchors to create function boundaries is just one example of a mechanism to correlate, e.g., align, the contextual information that are collected separately. Other events, such as mouse movement events, an event of entering a new software module, etc., may be used as anchors in alternative embodiments.

Figure 10:
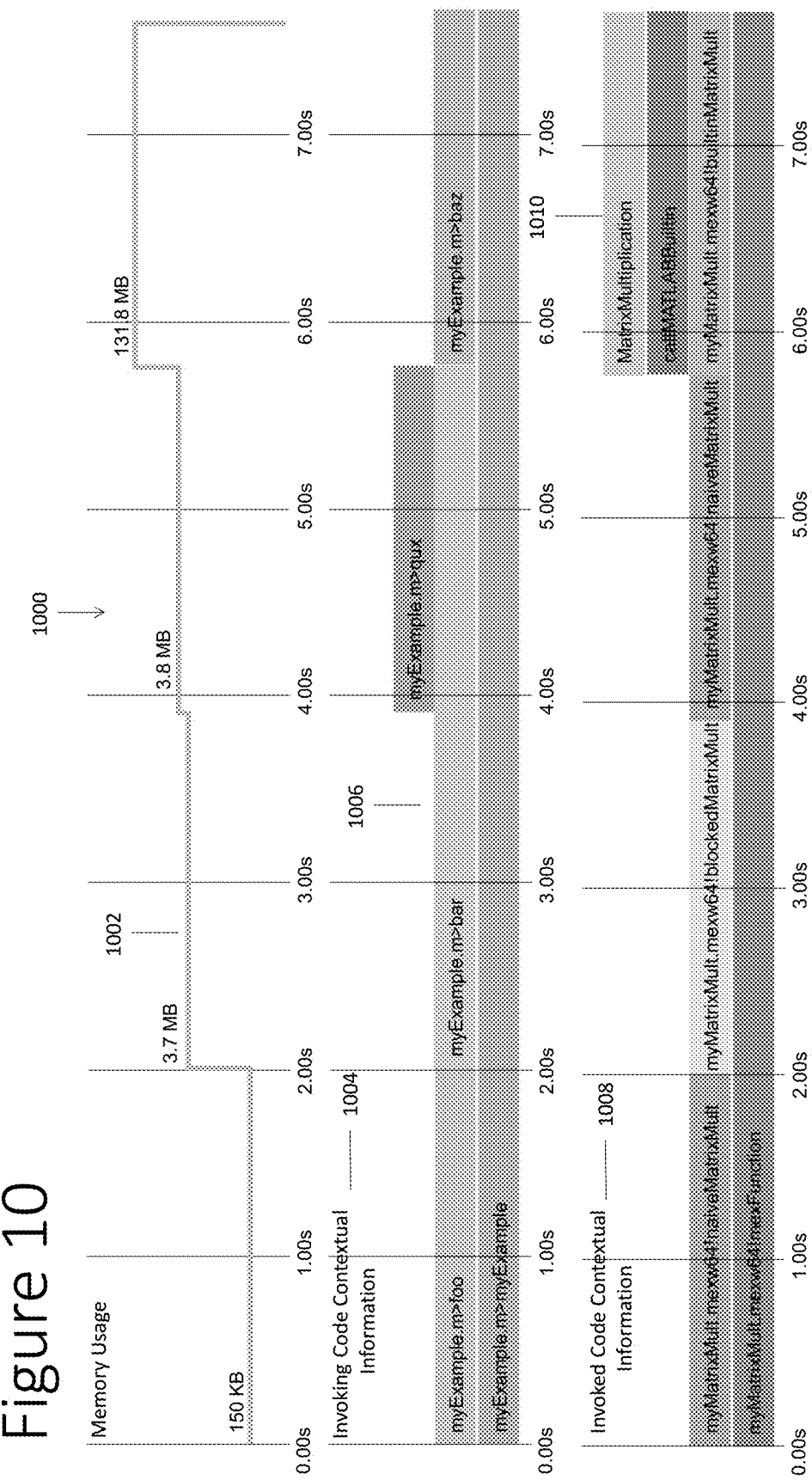
FIG. 10 depicts an illustrative presentation of example invoking code and example invoked code along the timeline with memory usage information

Other information may be used with or as an alternative to the timestamps and events. For example, performance metrics relating to memory usage or processor usage may be drawing in the same graphic representation. For instance, as shown in FIG. 10, information regarding memory usage, e.g., such as usage data collected during code execution by a memory usage monitor, may be arranged in a time order on the timeline. A plot 1000 may be added to the presentation of the invoking code contextual information 1004 and the presentation of the invoked code contextual information 1008. In this instance, the plot 1000 includes a curve 1002 of change in memory usage (e.g., total usage and the change in memory usage over time). As can be seen, a large increase in memory usage occurs at roughly 5.8 seconds. A review of the presentations 1004 and 1008 indicates this is when the baz function in the invoking code and builtinMatrixMult functions in the invoked code begin executing. Also, there is a small increase in memory usage when the bar function in the invoking call calls the qux function at about 3.9 seconds. This memory usage information can be very useful to developers to understand and manage memory usage. For example, the information can help developers pinpoint where the memory usage increases significantly and what the invoked code (e.g., C code) is doing at that time. Then the developers can use the invoking code (MATLAB) to create a reproductible code snippet. The exemplary embodiments may create a graphical representation which can provides concise information to developers without carrying out manual debugging steps.

Figure 11A:
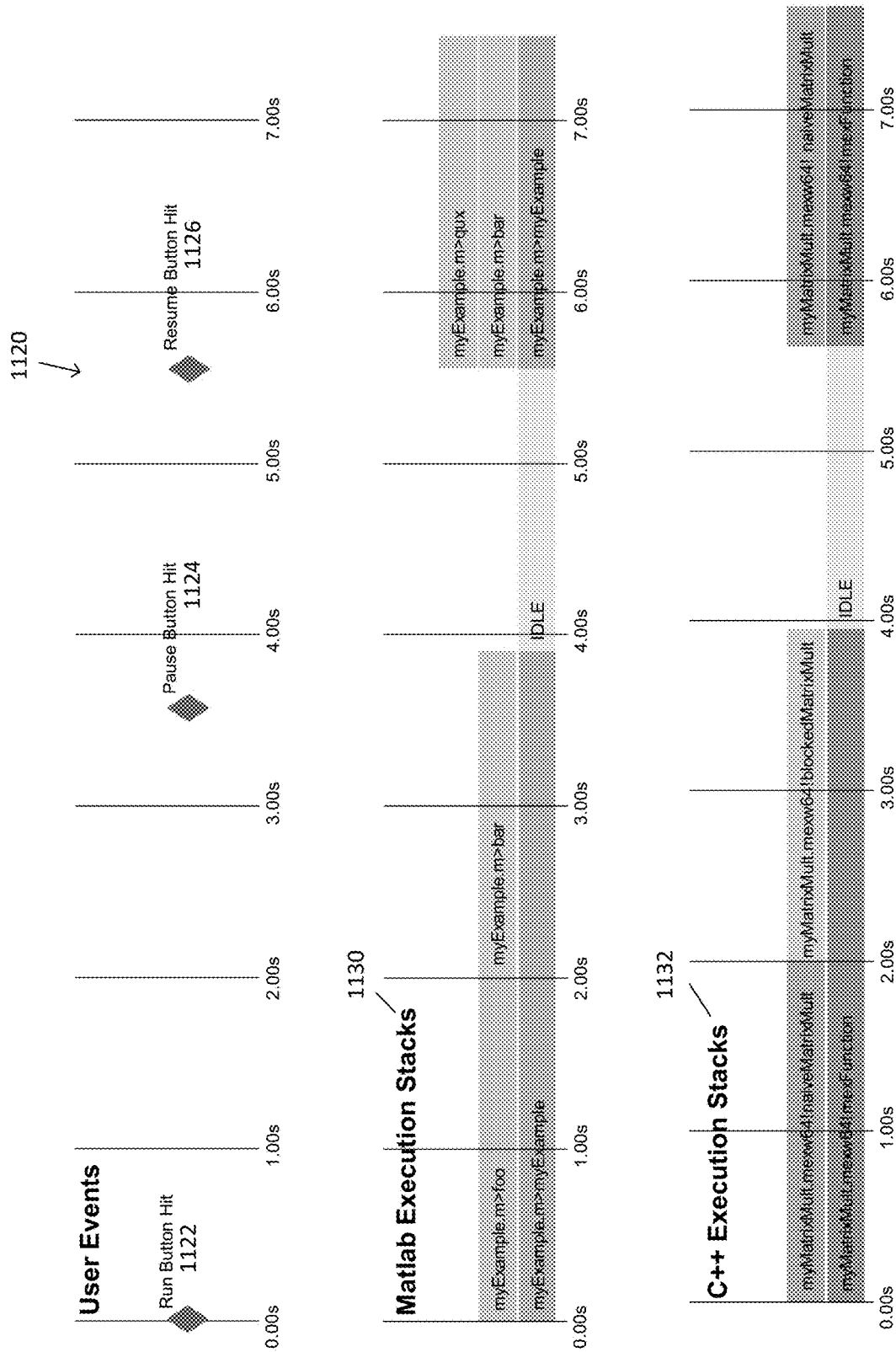
FIG. 11A depicts an illustrative presentation of invoking code and invoked code along a timeline with user action events.

Events may be arranged in a time order according to the timestamps to provide more information to the developers. FIG. 11A shows one example of a graphical presentation that shows when the user events happen on the time line. In FIG. 11A, the events are activation of buttons that may start, stop or resume execution of the code. FIG. 11A includes a plot of events 1120 as well as a presentation of the contextual information that is a sequence of executing components of the invoking code 1130 and the sequence of execution of the invoked code 1132. The events in this example, include the event at time 0 of pressing a run button 1122 to begin the invoking code running. The events also include hitting a pause button 1124 to pause execution. As can be seen in the execution sequences 1130 and 1132, the execution of the previously running components is paused. The third event shown in FIG. 11A is pushing the resume button 1126 so that the components may continue executing. Displaying the events, helps a developer to better understand the influence of the events on the executing components. For example, the developers can know what happens when the user hits the button.

The exemplary embodiments are not limited to instances in which the invoking code and/or invoked code are textual code; rather exemplary embodiments also include instances where the invoking code and/or invoked code are graphical code. FIG. 11B shows a graphical representation where the user application is constructed by using graphical components. By using the graphical representation, the developer can associate components of the graphical program with the invoked code, the graphical program components 1142 may be shown in the graphical presentation. The graphical program has a first block 1144 that computes a small matrix, a second block 1146 that computes a median matrix and a third block 1148 that computes a large matrix. These blocks are executed in the sequence 1144, 1146 and 1148 as indicated the arrows interconnecting the blocks.

FIG. 11B shows the sequence of events 1154 associated with these blocks along a timeline. A compute small matrix event 1152 is shown, followed by a compute median matrix event 1154 and a compute large matrix event 1156. The events trigger calls to invoked textual components as shown in sequence of execution 1162. Hence, the myExample program is invoked and calls the ComputeSmallMatrix function to calculate the small matrix at time 0. Once the small matrix is calculated, the median matrix is calculated by invoking the ComputeMedianMatrix function at 2 seconds. After the median matrix is calculated, the large matrix is calculated by invoking the ComputeLargeMatrix function at roughly 5.8 seconds. Thus, the graphical program components and the execution stacks in the invoked code are all shown together in a correlated manner.

Figure 12:
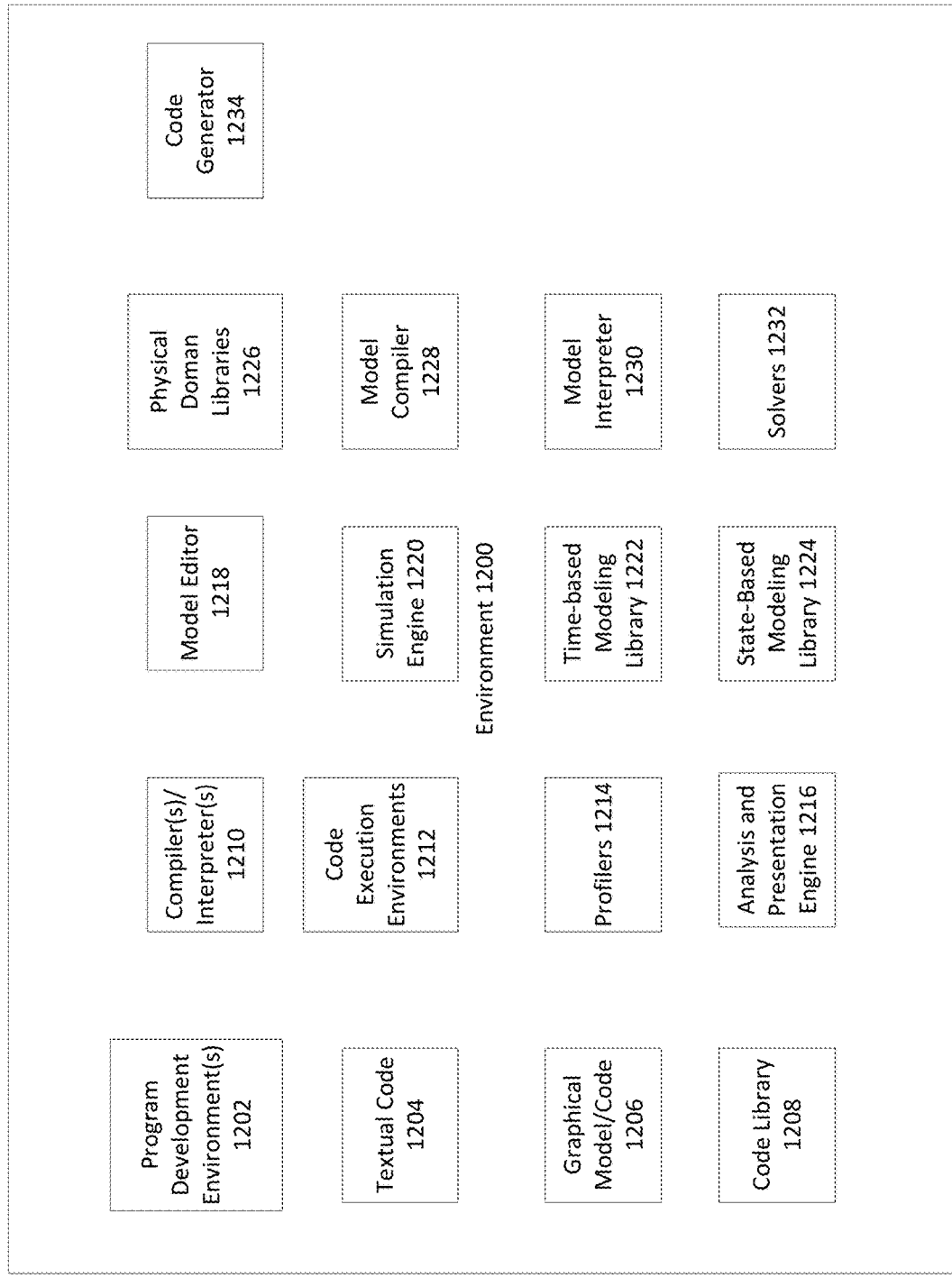
FIG. 12 depicts a block diagram of components of an example environment suitable for exemplary embodiments.

FIG. 12 is a block diagram of an environment 1200 suitable for practicing exemplary embodiments. The invoking code and invoked code may be textual, graphical, part of a textual model and/or a graphical model or generated from such a textual or graphical model. As such, the environment 1200 may include one or more program development environments 1202 for developing textual code or graphical code. Examples include program development environments, such as the MATLAB technical computing environment, a C development environment, a C++ development environment, a Python development environment, a Java development environment, a Visual Basic development environment, A LabView development environment or the like Textual code 1204 may be developed in the program development environment and stored. Similarly, graphical code 1206 may be developed in the program development environment and stored. The textual code and/or the graphical code may invoke code in a code library 1208 such as described above. Interpreters/compilers 1210 may be provided for interpreting or compiling the invoking code or invoked code. Code execution environments 1212 may be provided for executing the invoking code and invoked code. Profilers 1214 such as described above may be provided for profiling the invoking code and invoked code. The analysis 1216 and presentation engine may be provided to provide the functionality described above.

As was mentioned above, the invoking code or the invoked code may be from a graphical model or generated from a graphical model that is executable or simulatable. Thus, the environment 200 may include additional elements like those shown in FIG. 12. The environment 1200 may include a model editor 1218 for enabling the development and editing of graphical models, a simulation engine 1220, and one or more data stores, such as libraries, that contain predefined model element types. For example, the simulation environment may include a time-based modeling library 1222, a state-based modeling library 1224, and one or more physical domain modeling libraries 1226 for modeling different physical systems. Exemplary physical domains include electrical, hydraulic, magnetic, mechanical rotation, mechanical translation pneumatic, thermal, etc. Instances of the model element types provided by the libraries 1222, 1224, may be selected and included in a graphical model 1206, e.g., by the model editor 1218. The simulation engine 1220 may include, a model compiler 1228, an interpreter 1230, which may include one or more solvers exemplary solvers 1232, like one or more fixed-step continuous solvers, which may utilize integration techniques based on Euler's Method or Huen's Method, and one or more variable-step solvers, which may be based on the Runge-Kutta and Dormand-Prince pair. A description of suitable solvers may be found in the *Simulink User's Guide* from The MathWorks, Inc. (September 2019 ed.), which is hereby incorporated by reference in its entirety.

A code generator 1234 may be provided to generate code, such as textual code 1204, based on the graphical model 1206. For example, the code 1204 may have the same or equivalent functionality and/or behavior as specified by the executable simulation model 1206. The generated code, however, may be in form suitable for execution outside of the environment 1200. Accordingly, the generated code, which may be source code, may be referred to as standalone code. The compiler(s)/interpreters 1210 may compile the generated code to produce an executable, e.g., object code, that may be deployed on a target platform for execution, such as an embedded system.

Exemplary code generators include the Simulink HDL Coder, the Simulink Coder, the Embedded Coder, and the Simulink PLC Coder products from The MathWorks, Inc. of Natick, Mass., and the TargetLink product from dSpace GmbH of Paderborn Germany. Exemplary code that may be generated for the graphical model includes textual source code compatible with a programming language, such as the C, C++, C#, Ada, Structured Text, Fortran, and MATLAB languages, among others. Alternatively or additionally, the generated code may be (or may be compiled to be) in the form of object code or machine instructions, such as an executable, suitable for execution by a target device of an embedded system, such as a central processing unit (CPU), a microprocessor, a digital signal processor, etc. In some embodiments, the generated code may be in the form of a hardware description, for example, a Hardware Description Language (HDL), such as VHDL, Verilog, a netlist, or a Register Transfer Level (RTL) description. The hardware description may be utilized by one or more synthesis tools to configure a programmable hardware device, such as Programmable Logic Devices (PLDs), Field Programmable Gate Arrays (FPGAs), and Application Specific Integrated Circuits (ASICs), among others. The generated code 1232 may be stored in memory, such as a main memory or persistent memory or storage, of a data processing device.

Examples for the environment 200 may include the MATLAB® algorithm development environment and the Simulink® model-based design environment from The MathWorks, Inc., as well as the Simscape™ physical modeling system and the Stateflow® state chart tool also from The MathWorks, Inc., the MapleSim physical modeling and simulation tool from Waterloo Maple Inc. of Waterloo, Ontario, Canada, the LabVIEW virtual instrument programming system and the NI MatrixX model-based design product both from National Instruments Corp. of Austin, Tex., the Visual Engineering Environment (VEE) from Keysight Technologies, Inc. of Santa Clara, Calif., the System Studio model-based signal processing algorithm design and analysis tool and the SPW signal processing algorithm tool from Synopsys, Inc. of Mountain View, Calif., a Unified Modeling Language (UML) system, a Systems Modeling Language (SysML) system, the System Generator system from Xilinx, Inc. of San Jose, Calif., and the Rational Rhapsody Design Manager software from IBM Corp. of Somers, N.Y. Models created in the high-level simulation environment may contain less implementation detail, and thus operate at a higher level than certain programming languages, such as the C, C++, C#, and System C programming languages.

Figure 13:
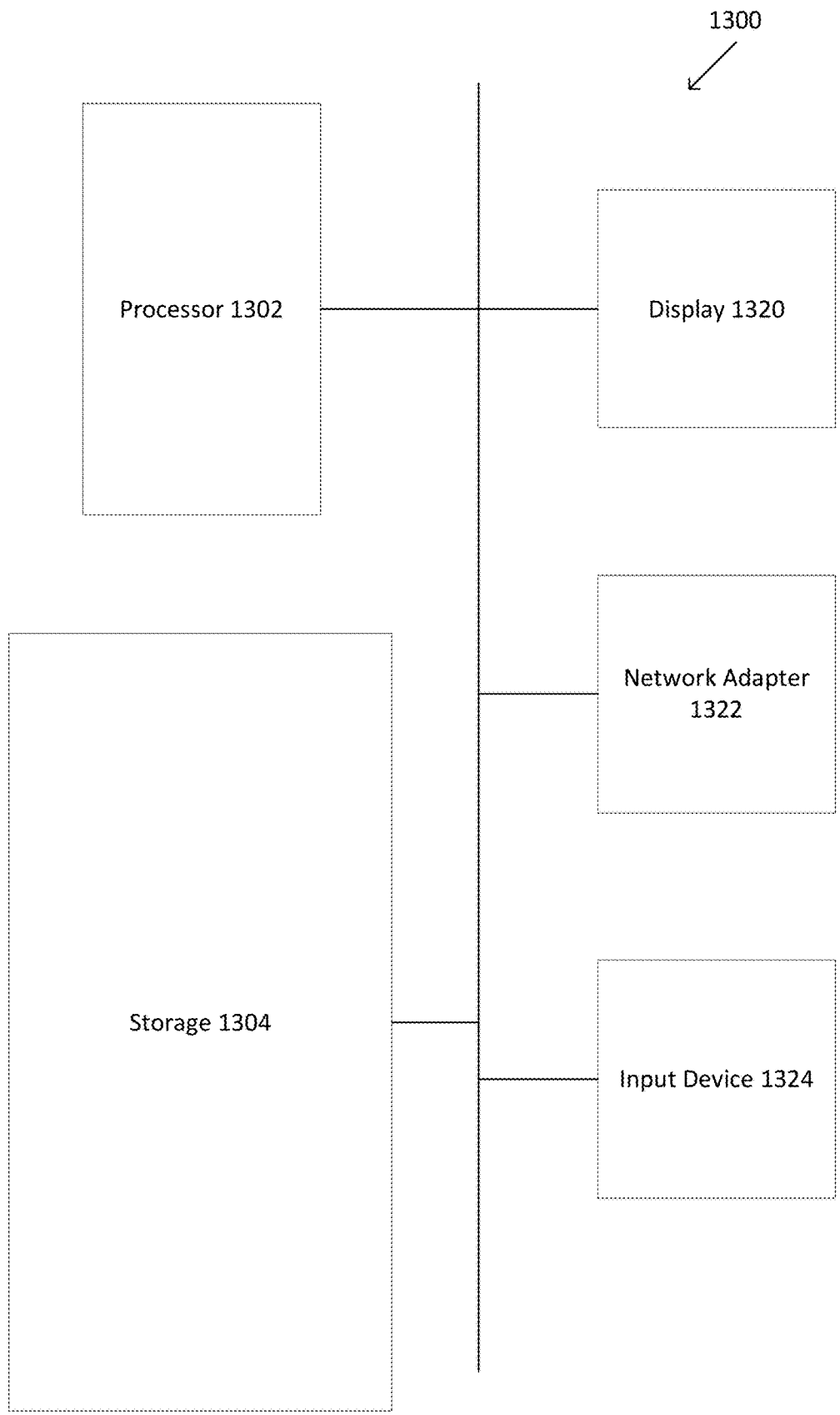
FIG. 13 depicts a block diagram of an illustrative computing device suitable for practicing an exemplary embodiment.

FIG. 13 depicts a block diagram of a computing device 1300 suitable for practicing an exemplary embodiment. The computing device 1300 may be a desktop computer, a laptop computer, a tablet computer, an embedded system, or other type of computing device. The computing device 1400 may include a processor 1302. The processor 1302 may be a central processing unit (CPU), a graphical processing unit (GPU), a field programmable gate array (FPGA), an application specific integrated circuit (ASIC), a controller, electronic circuitry or a combination thereof. The processor 1302 executes instructions to realize the functionality of the exemplary embodiments described herein. The processor 1302 has access to a storage 1304. The storage 1304 may be a magnetic storage device, an optical storage device or a combination thereof. The storage may include solid state storage, hard drives, removable storage elements such as magnetic disks, optical disks, thumb drives or the like. The storage 1304 may include RAM, ROM and other varieties of integrated circuit storage devices.

The storage 1304 may hold computer-executable instructions as well as data, documents and the like. The storage 1304 may hold copies of the components shown in the environment 1200 of FIG. 12. Executable components of the environment 1200 may be executed by the processor 1302. The computing device 1300 may include a display device 1312 for displaying video output. Examples include LED displays, LCD displays and retinal displays. The computing device 1300 may include a network adapter 1322 for interfacing the computing device with a network, such as a local area network or a network that provides access to a remote network like the Internet or another web-based network. The computing device 1300 may include input devices 1324 like a keyboard, mouse, microphone, scanner, pointing device or the like.

While the above description has provided a separate profiler for each programming language, there may be instances where a single profiler may profile execution of code in different programming languages.

It should be appreciated that there may be more than one variety of invoked code, with each variety being written in a different programming language. Further, there may be different sections of invoked code that are sequenced and visualized separately from the other sections of invoked code. For example, the invoking code may call separate MEX files that perform different operations that are better separately analyzed and visualized.

Figure 14:
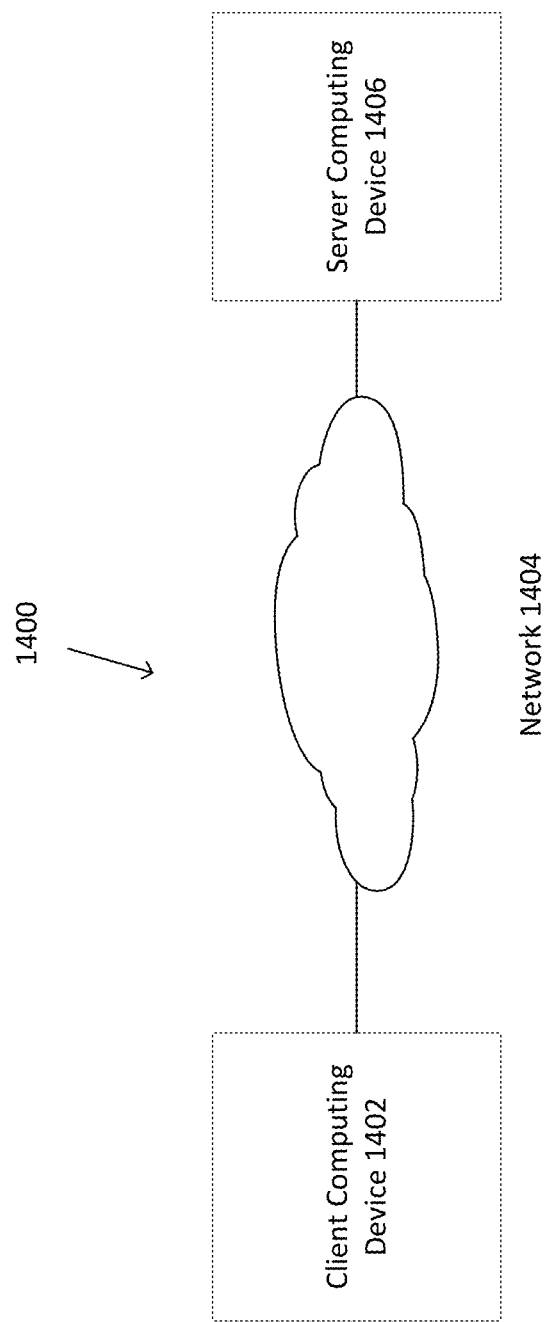
FIG. 14 depicts a distributed environment suitable for practicing an exemplary embodiment.

FIG. 14 depicts an illustrative distributed environment 1400 suitable for practicing exemplary embodiments. A client computing device 1402 is interfaced with a network 1404, such as a wide area network like the Internet, that is also interfaced with a server computing device 1406. The client computing device 1402 may include client code or a web browser for communicating with the server computing device 1404. For example, the analysis and presentation engine may run on the server computing device, and a client on the client computing device 1402 may request that server computing device 1406 analyze contextual information from a profiler and return the results. The server computing device 1406 may have a form like that shown in FIG. 13. The client computing device 1402 may also have components like that shown in FIG. 13.

While the present invention has been described with reference to exemplary embodiments herein, it should be appreciated that various changes in form and detail may be made without departing from the intended scope of the present invention as defined in the appended claims.

The invention claimed is:

1. A method implemented by a computing device having a processor, comprising:
    executing first code that is written in a first programming language on the processor, the executing of the first code in the first programming language resulting in second code in a second programming language being executed;
    obtaining first contextual information regarding the first code in the first programming language at first sampled times over a time period during the executing, for each of the first sampled times, the first contextual information identifying which components in the first code are miming at the sampled time;
    obtaining second contextual information regarding the second code in the second programming language at second sampled times over the time period, for each of the second sampled times, the second contextual information identifying which components of the second code are executing at the sampled time;
    for a first component of the first code that is identified to execute for a first time period including a first starting sampled time within the first sample times and a first ending sampled time within the first sample times, identifying one or more second components of the second code that execute for a second time period including a second starting sampled time within the second sample times and a second ending sample time within the second sample times, the one or more second components being invoked by the first component during executing the first component, the identifying comprising:
        determining the second starting sampled time corresponds to the first starting sampled time based on analyzing temporal order or event information of the first and second contextual information, and
        correlating the first contextual information obtained regarding the first code in the first programming language with the second contextual information obtained regarding the second code in the second programming language.

2. The method of claim 1, wherein the displaying comprises displaying graphical information on the display that identifies at least some of the components of the first code and at least some of the components of the second code that are executing for each sampled time of the time period.

3. The method of claim 1, wherein timestamps are recorded for each of the first sample times and each of the second sample times and wherein the timestamps are used in the analyzing temporal order for the obtained first contextual information and the second contextual information.

4. The method of claim 1, wherein the first code invokes the second code.

5. The method of claim 1, wherein the second code includes an invoking component that invokes an additional component in the second code.

6. The method of claim 1, wherein the second code includes at least one library module.

7. The method of claim 1, wherein the first code or the second code comprises graphical code or textual code.

8. The method of claim 1, wherein the obtaining the first contextual information comprises using a profiler for the first programming language to profile the first code to generate the first contextual information or receiving the first contextual information from storage.

9. The method of claim 1, wherein the obtaining the second contextual information comprises one of:
retrieving the second contextual information from a storage, or
invoking a profiler for the second programming language to profile the second code to generate the second contextual information; and
receiving the second contextual information from the profiler of the second programming language.

10. The method of claim 1, wherein at least one of the first contextual information or the second contextual information comprises snapshots of an execution stack.

11. The method of claim 1, wherein the components comprise at least one of functions, procedures, subroutines, library modules or methods.

12. The method of claim 1, further comprising using events indicative of the components starting and events indicative of the components stopping in ordering the components in the temporally ordering.

13. A non-transitory computer-readable storage medium storing instructions executable by a processor of a computing device to perform:
execute first code that is written in a first programming language on the processor, the executing of the first code in the first programming language resulting in second code in a second programming language being executed;
obtain first contextual information regarding the first code in the first programming language at first sampled times over a time period during the executing, for each of the first sampled times, the first contextual information identifying which components in the first code are miming at the sampled time;
obtain second contextual information regarding the second code in the second programming language at the second sampled times over the time period, for each of the second sampled times, the second contextual information identifying which components of the second code are executing at the sampled time;
for a first component of the first code that is identified to execute for a first time period including a first starting sampled time within the first sample times and a first ending sampled time within the first sample times, identify one or more second components of the second code that execute for a second time period including a second starting sampled time within the second sample times and a second ending sample time within the second sample times, the one or more second components being invoked by the first component during executing the first component, the identifying comprising:
determining the second starting sampled time corresponds to the first starting sampled time based on analyzing temporal order or event information of the first and second contextual information, and
correlating the first contextual information obtained regarding the first code in the first programming language with the second contextual information obtained regarding the second code in the second programming language.

14. The non-transitory computer-readable storage medium of claim 13, wherein the displaying comprises displaying graphical information on the display that identifies at least some of the components of the first code and at least some of the components of the second code that are executing for each sampled time of the time period.

15. The non-transitory computer-readable storage medium of claim 13, wherein timestamps are recorded for each of the first sample times and each of the second sample times and wherein the timestamps are used in the analyzing temporal order for the obtained first contextual information and the second contextual information.

16. The non-transitory computer-readable storage medium of claim 13, wherein the first code invokes the second code.

17. The non-transitory computer-readable storage medium of claim 13, wherein the second code includes an invoking component that invokes an additional component in the second code.

18. The non-transitory computer-readable storage medium of claim 13, wherein the first code or the second code is graphical code or textual code.

19. The non-transitory computer-readable storage medium of claim 13, wherein the obtaining the first contextual information comprises at least one of using a profiler for the first programming language to profile the first code to generate the first contextual information or receiving the first contextual information from storage.

20. The non-transitory computer-readable storage medium of claim 13, wherein the obtaining the second contextual information comprises one of:
retrieving the second contextual information from a storage, or
invoking a profiler for the second programming language to profile the second code to generate the second contextual information; and
receiving the second contextual information from the profiler of the second programming language.

21. The non-transitory computer-readable storage medium of claim 13, wherein at least one of the first contextual information or the second contextual information comprises snapshots of an execution stack.

22. The non-transitory computer-readable storage medium of claim 16, further storing instructions for using events indicative of the components starting and events indicative of the components stopping in ordering the components in the correlating.

23. A method performed by a processor of a computing device, comprising:
receiving sampled execution contextual information at first sampling times from a first profiler that is profiling first code written in a first programming language and sampled execution contextual information at second sampling times from a second profiler that is profiling second code written in a second programming language, wherein, for each of the first sampling times and the second sampling times, the sampled execution contextual information holds information regarding what components are executing at that sampling time;
storing the sampled execution contextual information along with timestamp information for the sampled execution contextual information;
processing the stored sampled execution contextual information and the timestamp information to generate a graphical presentation that depicts what components of the first code and what components of the second code are executing along a timeline;
adding annotations to the graphical presentation, wherein the annotations are ordered per time on the timeline and provide information about activity at that time; and
displaying the graphical presentation on a display device with the annotations.

24. The method of claim 23, wherein the annotations are event markers reflecting when events occur along the timeline.

25. The method of claim 23, wherein the annotations reflect measured metrics information.

26. The method of claim 25, wherein the measured metrics information is memory usage information or processor usage information at the sampling times.

27. The method of claim 23, wherein each annotation reflects what graphical modeling component is executing or being simulated.

28. The method of claim 23, wherein the annotations identify what graphical programming constructs are executing.

29. A non-transitory computer-readable storage medium storing instructions executable by a processor of a computing device to perform:
    receive sampled execution contextual information at first sampling times from a first profiler that is profiling first code written in a first programming language and at second sampling times from a second profiler that is profiling second code written in a second programming language, wherein, for each of the first sampling times and the second sampling times, the sampled execution contextual information holds information regarding what components are executing at that sampling time;
    store the sampled execution contextual information along with timestamp information for the sampled execution contextual information;
    process the stored sampled execution contextual information and the timestamp information to generate a graphical representation that depicts what components of the first code and what components of the second code are executing along a timeline;
    add annotations to the graphical representation, wherein the annotations are ordered per time on the timeline and provide information about activity at that time; and
    display the graphical representation on a display device with the annotations.

30. The non-transitory computer-readable storage medium of claim 29, wherein the annotations are event markers reflecting when events occur along the timeline.

31. The non-transitory computer-readable storage medium of claim 29, wherein the annotations reflect measured metrics information.

32. The non-transitory computer-readable storage medium of claim 31, wherein the measured metrics information is memory usage information or processor usage information.

33. The non-transitory computer-readable storage medium of claim 29, wherein the annotations reflect what graphical modeling component is executing or being simulated.

34. The non-transitory computer-readable storage medium of claim 29, wherein the annotations identify what graphical programming constructs are executing at the sampling times.

* * * * *